United States Patent
Crisan et al.

(10) Patent No.: US 9,219,689 B2
(45) Date of Patent: Dec. 22, 2015

(54) SOURCE-DRIVEN SWITCH PROBING WITH FEEDBACK REQUEST

(71) Applicant: International Business Machines Corporation, Armonk, NY (US)

(72) Inventors: Daniel Crisan, Adliswil (CH); Casimer M. DeCusatis, Poughkeepsie, NY (US); Mircea Gusat, Langnau (CH); Cyriel J. Minkenberg, Gutenswil (CH)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 13/834,503

(22) Filed: Mar. 15, 2013

(65) Prior Publication Data

US 2014/0281020 A1 Sep. 18, 2014

(51) Int. Cl.
*H04L 12/26* (2006.01)
*H04L 12/815* (2013.01)
*H04L 12/801* (2013.01)
*H04L 12/947* (2013.01)
*H04L 12/931* (2013.01)
*H04L 12/803* (2013.01)

(52) U.S. Cl.
CPC ............. *H04L 47/127* (2013.01); *H04L 43/02* (2013.01); *H04L 43/04* (2013.01); *H04L 47/122* (2013.01); *H04L 49/25* (2013.01); *H04L 49/50* (2013.01)

(58) Field of Classification Search
None
See application file for complete search history.

(56) References Cited

U.S. PATENT DOCUMENTS

| | | | |
|---|---|---|---|
| 5,751,969 A * | 5/1998 | Kapoor | 709/235 |
| 6,901,053 B1 | 5/2005 | Davies | |
| 7,706,353 B2 | 4/2010 | Roy | |
| 7,756,959 B1 | 7/2010 | Beshai et al. | |
| 7,782,793 B2 | 8/2010 | Olesinski et al. | |
| 7,787,367 B2 | 8/2010 | Gusat et al. | |
| 7,830,793 B2 | 11/2010 | Gai et al. | |
| 7,873,441 B2 | 1/2011 | Synesiou et al. | |
| 7,957,293 B2 | 6/2011 | Mayhew | |

(Continued)

FOREIGN PATENT DOCUMENTS

| | | |
|---|---|---|
| CN | 102025617 A | 4/2011 |
| JP | 2011146982 A | 7/2011 |
| WO | 2011065268 A1 | 6/2011 |

OTHER PUBLICATIONS

Briscoe et al., "Tunnelling of Explicit Congestion Notification (RFC6040)", Terminal Disclosure, Nov. 1, 2010, 71 pages.

(Continued)

*Primary Examiner* — Nicholas Taylor
*Assistant Examiner* — Clayton R WIlliams
(74) *Attorney, Agent, or Firm* — Cantor Colburn LLP; Steven Chiu

(57) ABSTRACT

Embodiments relate to proactively probing the packet queues of elements in a physical or virtual network to predict and prevent the occurrence of congestion points. An aspect includes receiving a first feedback request at a central controller connected to a plurality of switches in a network. The first feedback request includes a request to periodically probe a status of queues of switches in the network. A second feedback request is then transmitted to one or all the switches in a path leading to a designated destination. Responses to the second feedback request are received at the central controller from a designated proxy switch, which aggregated the responses into a single data packet. Accordingly, the responses extracted from the single data packet at the central controller are used to preventing future congestion points.

6 Claims, 4 Drawing Sheets

(56) References Cited

U.S. PATENT DOCUMENTS

| | | | |
|---|---|---|---|
| 8,054,744 B1 | 11/2011 | Bishara et al. | |
| 8,059,532 B2 | 11/2011 | Riddle et al. | |
| 8,089,884 B2 | 1/2012 | Liu | |
| 8,174,978 B2 | 5/2012 | Naven et al. | |
| 8,189,479 B1* | 5/2012 | Doherty et al. | 370/236 |
| 8,260,956 B2 | 9/2012 | Reyhner et al. | |
| 2002/0095493 A1 | 7/2002 | Byrnes | |
| 2005/0091303 A1* | 4/2005 | Suzuki | 709/200 |
| 2006/0056308 A1 | 3/2006 | Gusat et al. | |
| 2008/0049746 A1* | 2/2008 | Morrill et al. | 370/389 |
| 2008/0062879 A1 | 3/2008 | Sivakumar et al. | |
| 2008/0080504 A1 | 4/2008 | Gusat et al. | |
| 2008/0273465 A1 | 11/2008 | Gusat et al. | |
| 2008/0282058 A1 | 11/2008 | Maher et al. | |
| 2009/0135729 A1 | 5/2009 | Saffre | |
| 2009/0234908 A1 | 9/2009 | Reyhner et al. | |
| 2009/0238070 A1 | 9/2009 | Rivers et al. | |
| 2009/0279433 A1 | 11/2009 | Briscoe et al. | |
| 2009/0300209 A1 | 12/2009 | Elzur | |
| 2011/0035498 A1 | 2/2011 | Shah et al. | |
| 2011/0158091 A1 | 6/2011 | Sun et al. | |
| 2011/0164496 A1 | 7/2011 | Loh et al. | |
| 2011/0176423 A1 | 7/2011 | Chowdhury et al. | |
| 2011/0255402 A1 | 10/2011 | Fourcand | |
| 2011/0261722 A1 | 10/2011 | Awano | |
| 2011/0261723 A1 | 10/2011 | Yamato et al. | |
| 2011/0261831 A1* | 10/2011 | Sharma et al. | 370/412 |
| 2011/0273988 A1 | 11/2011 | Tourrilhes et al. | |
| 2011/0285516 A1* | 11/2011 | Ritter | 340/286.02 |
| 2011/0286324 A1 | 11/2011 | Bellagamba et al. | |
| 2011/0299389 A1 | 12/2011 | Mau et al. | |
| 2012/0020219 A1 | 1/2012 | Kamiya et al. | |
| 2012/0140626 A1 | 6/2012 | Anand et al. | |
| 2012/0151472 A1 | 6/2012 | Koch et al. | |
| 2012/0155256 A1 | 6/2012 | Pope et al. | |
| 2012/0163178 A1 | 6/2012 | Gordon et al. | |
| 2013/0155850 A1 | 6/2013 | Chrysos et al. | |
| 2013/0155857 A1 | 6/2013 | Chrysos et al. | |
| 2013/0155858 A1 | 6/2013 | Chen et al. | |
| 2013/0294236 A1 | 11/2013 | Beheshti-Zavareh et al. | |
| 2014/0071814 A1* | 3/2014 | Landscheidt et al. | 370/229 |
| 2014/0161135 A1 | 6/2014 | Acharya et al. | |
| 2014/0241345 A1 | 8/2014 | Decusatis et al. | |
| 2014/0269274 A1 | 9/2014 | Banavalikar et al. | |

OTHER PUBLICATIONS

Crisan et al., "Comparative Evaluation of CEE-based Switch Adaptive Routing", IBM, 2010, pp. 1-12.
Crisan et al., "Short and Fat: TCP Performance in CEE Datacenter Networks", Proceedings of 2011 IEEE 19th Annual Symposium on High Performance Interconnects (HOTI 2011), pp. 43-50.
Hagen et al., "Performance Evaluation of DCB's Priority-Based Flow Control", Proceedings 2011, IEEE 10th International Symposium on Network Computing & Applications (NCA 2011), pp. 328-333.
Hayashi et al., "Improving Fairness of Quantized Congestion Notification for Data Center Ethernet Networks", Proceedings of 2011 31st International Conference on Distributed Computing Systems Workshops (ICDCS Workshops), pp. 20-25, 2011.
Minkenberg et al., "Adaptive Routing for Convergence Enhanced Ethernet", HPSR'09 Proceedings of 15th International Conference on High Performance Switching & Routing, Nov. 3, 2009, 8 pages.
Welzl et al, "Congestion Control in the RFC Series (RFC5783)", Technical Disclosure, Feb. 1, 2010, 57 pages.
Zhang et al., "An Adaptive Congestion Control Strategy for Wireless Sensor Networks", 2011 International Conference on Information Technology, Computer Engineering and Management Services (ICM), 2, pp. 265-268.
P. Devkota, et al.,"Performance of Quantized Congestion Notification in TCP Incast in Data Centers," 18th Annual IEEE/ACM International Symposium on Modeling, Analysis and Simulation of Computer and Telecommunication Systems, 2010, pp. 1-9.
R Devkota, et al.,"Performance of Quantized Congestion Notification in TCP Incast in Data Centers," A Thesis, Texas AandM University, May 2010, pp. 1-91.
Gusat, et al., "R3C2: Reactive Route and Rate Control for CEE," 18th IEEE Symposium on High Performance Interconnects, 2010, pp. 1-8.
IBM Systems and Technology, "Software Defined Networking: a New Paradigm for Virtual, Dynamic, Flexible Networking," Thought Leadership White Paper, IBM, Oct. 2012, pp. 1-6.
S. Lam, et al.,"An Experimental Study of the Congestion Control of Packet Communication Networks," IPCOM000152019D, IP.com Prior Art Database, Mar. 1980, pp. 1-55.
McKeown, et al.,"OpenFlow: Enabling Innovation in Campus Nettworks," ACM SIGCOMM Computer Communication Review archive, vol. 38 Issue 2, 2008, pp. 1-6.
Pfaff, et al. "OpenFlow Switch Specification," Version 1.1.0 Implemented (Wire Protocol 0×02), Feb. 28, 2011, pp. 1-56.
D. Papadimitriou, et al.,"Open Research Issues in Internet Congestion Control," (RFC6077), IPCOM000203818D, IP.com Prior Art Database, Feb. 2011, pp. 1-103.
M. Suchara, et al.,"Network Architecture for Joint Failure, Recovery and Traffic Engineering," SIGMETRICS'11, ACM, Jun. 2011, pp. 1-12.
UK International Search Report and Written Opinion for International Application No. PCT/IB2014/059458; International Filing Date: Mar. 5, 2014; Date of mailing: Jun. 10, 2014; 6 pages.
Tam et al., "Leveraging Performance of Multiroot Data Center Networks by Reactive Reroute," 2010 18th IEEE Symposium on High Performance Interconnects, IEEE Computer Society, 2010, pp. 66-74.
D. Papadimitriou, et al., "Open Research Issues in Internet Congestion Control", (RFC6077), IPCOM000203818D, IP.com Prior Art Database, Feb. 2011, pp. 1-103.
Dinu et al., "Inferring a Network Congestion Map with Zero Traffic Overhead", 2011 19th IEEE International Conference on Network Protocols (ICNP), pp. 69-78.
IBM Systems and Technology, "Software Defined Networking: A New Paradigm for Virtual Dynamic, Flexible Networking" Thought Leadership White Paper, IBM, Oct. 2012, pp. 1-8.
M. Suchara et al "Network Architecture for Joint Failure, Recovery and Traffic Engineering", SIGMETRICS'11, ACM, Jun. 2011, pp. 1-12.
McKeown et al, "OpenFlow: Enabling Innovation in Campus Networks" ACM SIGCOMM Computer Communication Review Archive, vol. 38, Issue 2, 2008, pp. 1-6.
P. Devkota, et al "Performance of Quantized Congestion Notification in TCP Incast in Data Centers", 18th Annual IEEE/ACM International Symposium on Modeling, Analysis and Simulation of Computer and Telecommunication Systems, 2010, pp. 1-9.
U.S. Appl. No. 13/834,679; Non-Final Office Action; filed Mar. 15, 2013; Date Mailed: Mar. 19, 2015; 28 pages.
U.S. Appl. No. 13/834,455; Final Office Action; filed Mar. 15, 2013; Date Mailed Jun. 25, 2015; 24 pages.
U.S. Appl. No. 13/834,455; Non-Final Office Action; filed Mar. 25, 2013; Date Mailed: Dec. 11, 2014; 44 pages.
U.S. Appl. No. 14/501,491; Non-Final Office Action, filed Sep. 13, 2014; Date Mailed: Mar. 3, 2015; 37 pages.
U.S. Appl. No. 14/501,908; Non-Final Office Action; filed Sep. 30, 2014; Date Mailed: Apr. 28, 2015; 24 pages.

* cited by examiner

SOURCE-DRIVEN SWITCH PROBING WITH FEEDBACK REQUEST

BACKGROUND

The present invention relates to network load monitoring, load balancing and congestion controlling, and more specifically, to proactively probing the packet queues of elements in a physical or virtual network to predict and prevent the occurrence of congestion points.

IEEE 802.1 data center bridging (DCB) Ethernet is often used as a primary physical network protocol in datacenters for computer-to-computer communications. In contrast to the modern 802.1Qau DCB (i.e., convergence enhanced Ethernet (CEE)/data center Ethernet (DCE)), the traditional Ethernet was typically designed to be a best-effort network and may experience network congestion. Network congestion occurs when a link or node is carrying so much data that its quality of service deteriorates. Typical effects include queueing delay, packet loss and/or the blocking of new connections. A consequence of packet loss or the blocking of new connections is that incremental increases in offered load only lead to small increases in network throughput or to an actual reduction in network throughput. Moreover, network congestion may lead to a congestive collapse at a choke point in the network, where the total incoming traffic to a node exceeds the outgoing bandwidth. When a network is in such a condition, there are high levels of packet delay and loss and general quality of network service is poor. These effects are aggravated in the modern multitenant datacenters using server and network virtualization on top of Layer 2 CEE fabrics with Priority Flow Control (PFC, 802.1Qbb), used for converged lossless traffic. Hence the need for Quantized Congestion Notification (QCN, 802.1 Qau), which is today built in most modern CEE switches and adapters, as well as being introduced in the new Virtual Overlays and software-defined networking (SDN) solutions.

SUMMARY

According to embodiment of the present invention, a system for proactively probing the packet queues of elements in a physical or virtual network to predict and prevent the occurrence of congestion points is provided. The system includes a computer processor and logic executable by the computer processor. The logic is configured to implement a method. The method includes receiving a first feedback request at a central controller connected to a plurality of switches in a network. The first feedback request includes a request to periodically probe a status of queues of switches in the network. A second feedback request is then transmitted to one or all the switches in a path leading to a designated destination. Responses to the second feedback request are received at the central controller from a designated proxy switch, which aggregated the responses into a single data packet. Accordingly, the responses extracted from the single data packet at the central controller are used to preventing future congestion points.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
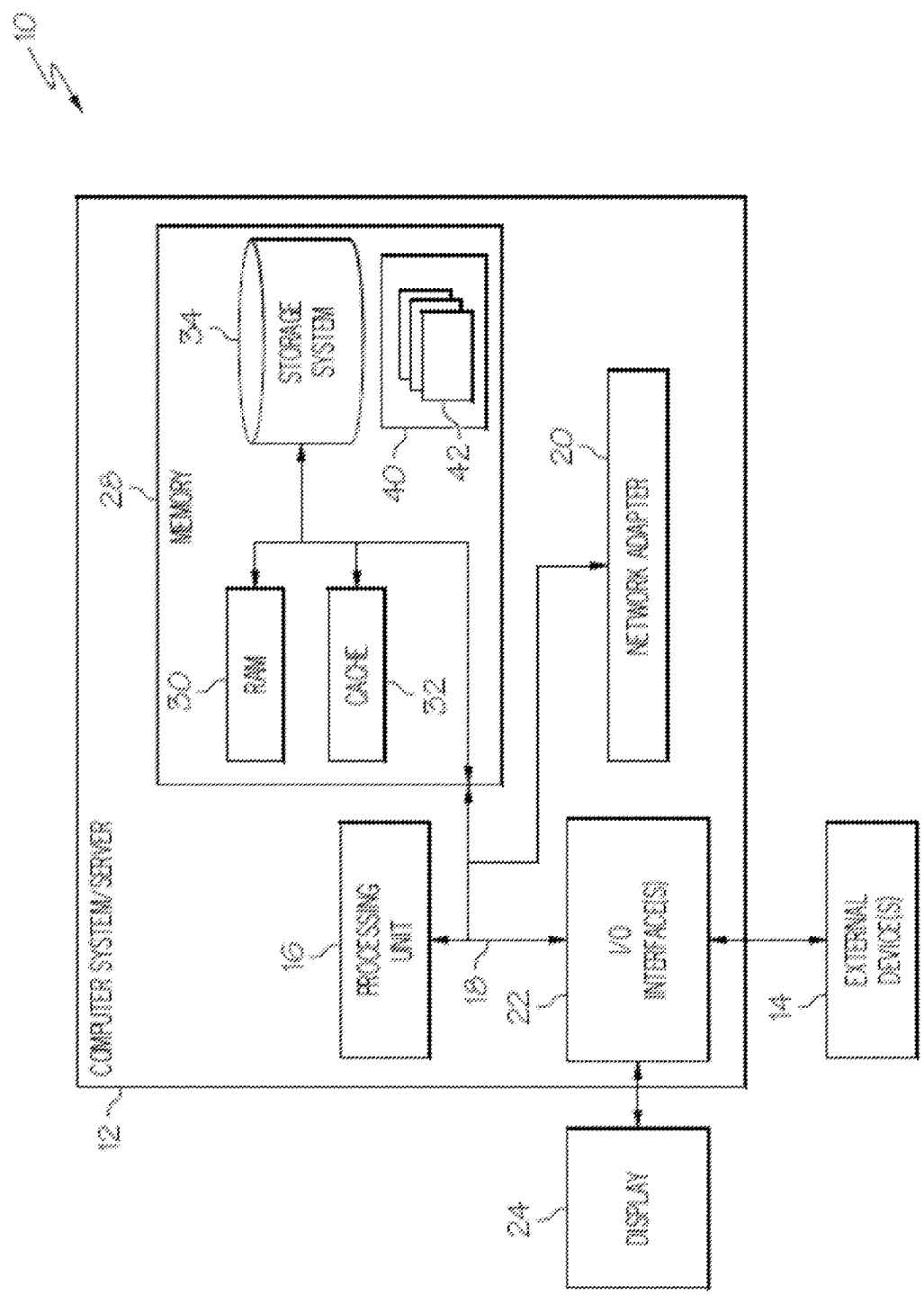
FIG. 1 depicts a cloud computing node according to an embodiment.

Embodiments disclosed herein proactively probe a current state of a network to predict future load and congestion and prevent the occurrence of the predicted congestion. These physical or virtual queues are assumed observable via packet sampling such as QCN Congestion Point (CP) load sensor, RED, REM, sFlow, NetFlow, OpenFlow, or any other future monitoring method.

Embodiments may be used for monitoring, management, heatmapping, load balancing, source-based routing, adaptive routing in physical and virtual networks, or inside a computer system that entails observable queues. The polling/interrogation feedback request process can be initiated by any network endnode (e.g., source server, storage, physical, virtual), a central controller, hypervisor, console, or even another network node (e.g., switch, adapter).

Contemporary data center networks do not provide a mechanism by which data on predicted congestion points (e.g., queues instrumented with QCN CP samplers, which may become hotspots) may be collected in a proactive manner. That is, contemporary datacenter networks only react to the occurrence of congestion, post factum. Embodiments disclosed herein provide a method to proactively predict where congestion points will occur in the network before they happen, or to monitor the load for service-level agreement (SLA) compliance.

Accordingly, once the predicted congestion points (hotspots, monitored as e.g., QCN CPs) have been identified, embodiments can proactively reroute traffic to avoid the occurrence of the predicted congestion (hotspot). Embodiments also provide methods for proactive rerouting of packets based on a history of traffic in the network or adjusting the injection rates at traffic sources to avoid backspreading of congestion and head of line (HOL) blocking as in saturation tree. According to an embodiment, if new network traffic matches a stored historical profile, a central controller may predict that the new network traffic will result in congestion in the same areas as the historical profile.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of a cloud computing node for proactively probing a current state of a network to enable switches in the network to adapt to forthcoming network conditions is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device, also referred to as a processing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, PCIe, AMD HyperTransport bus, or the like.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
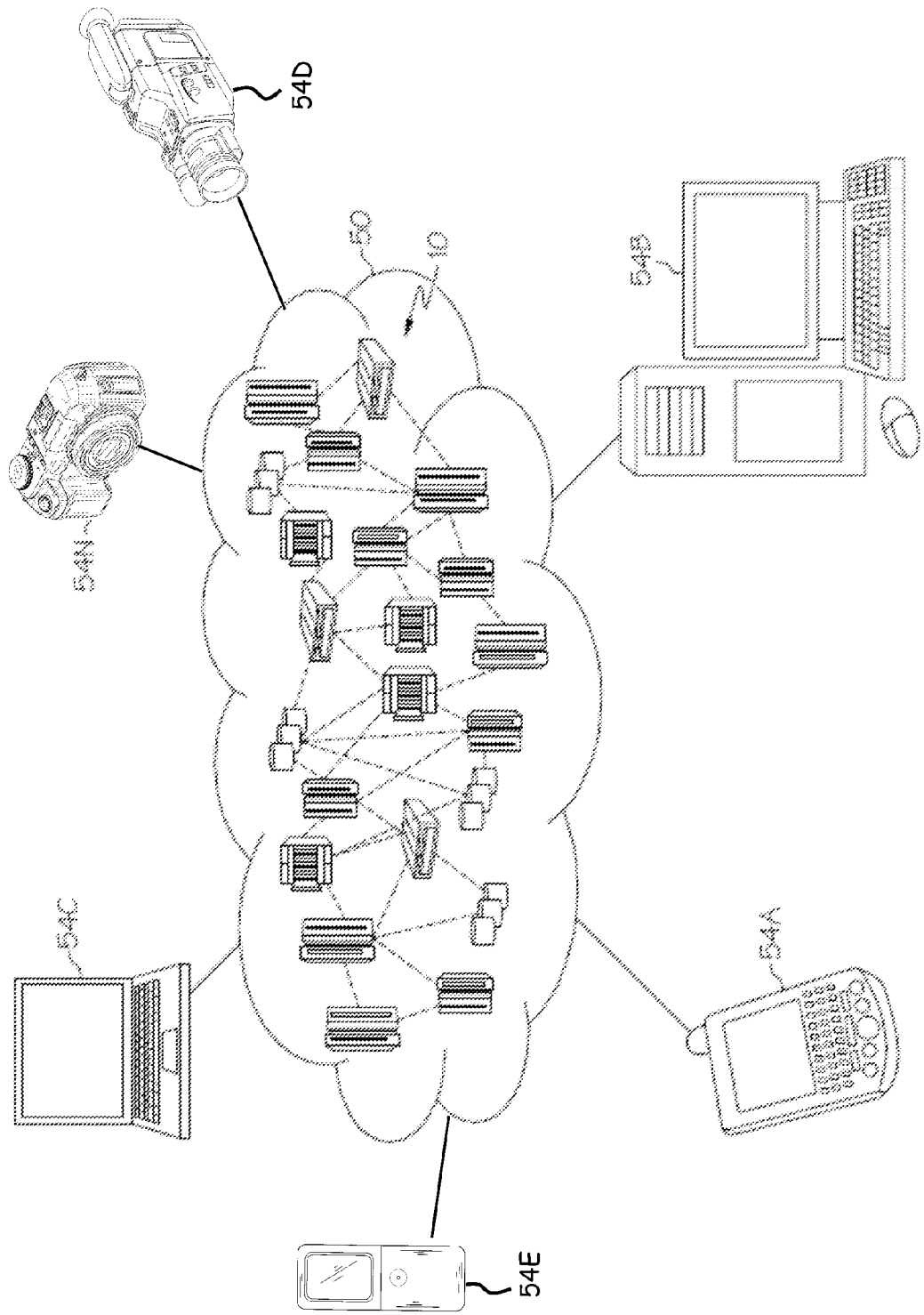
FIG. 2 depicts a cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
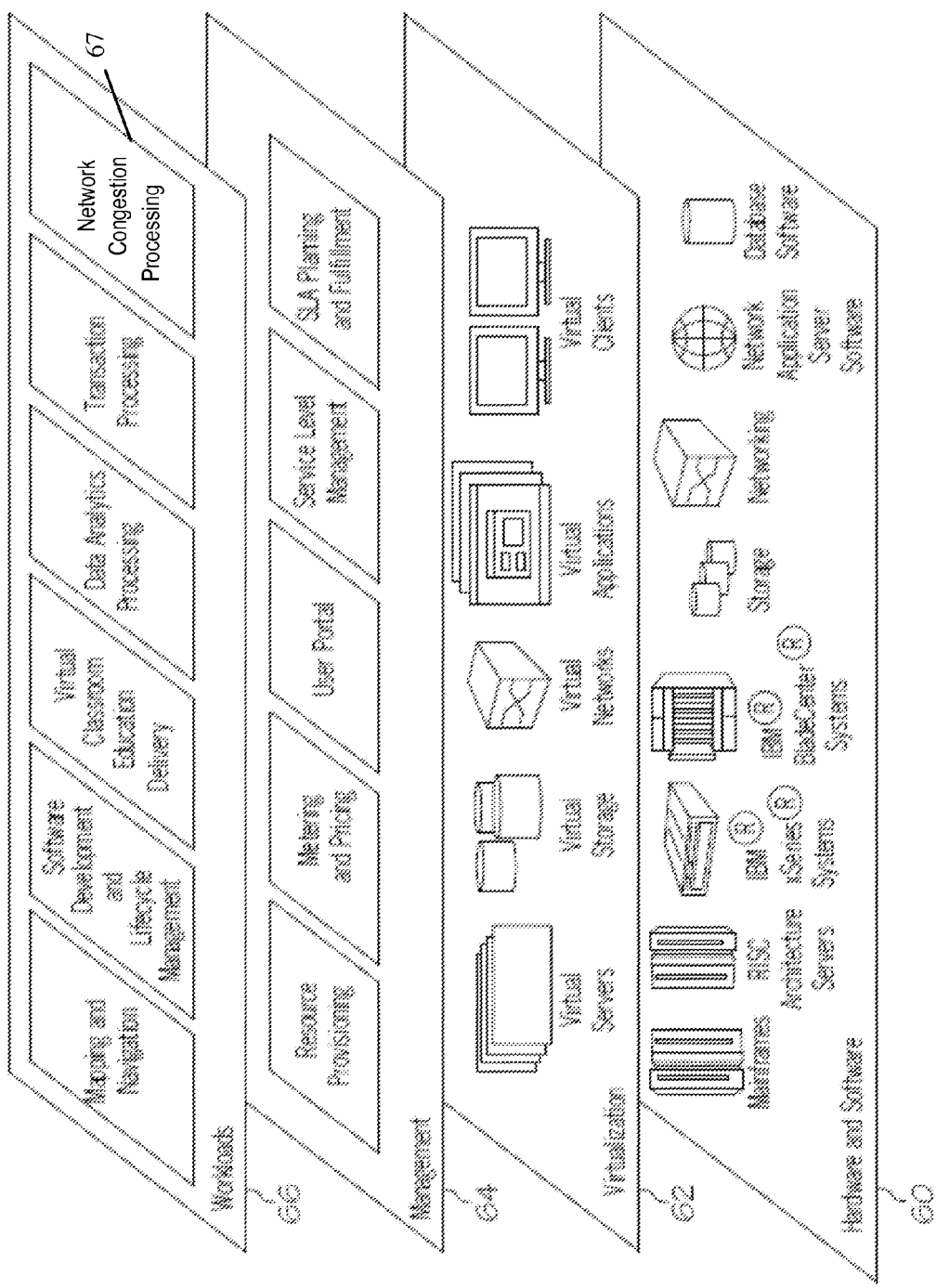
FIG. 3 depicts abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and network congestion processing 67.

Figure 4:
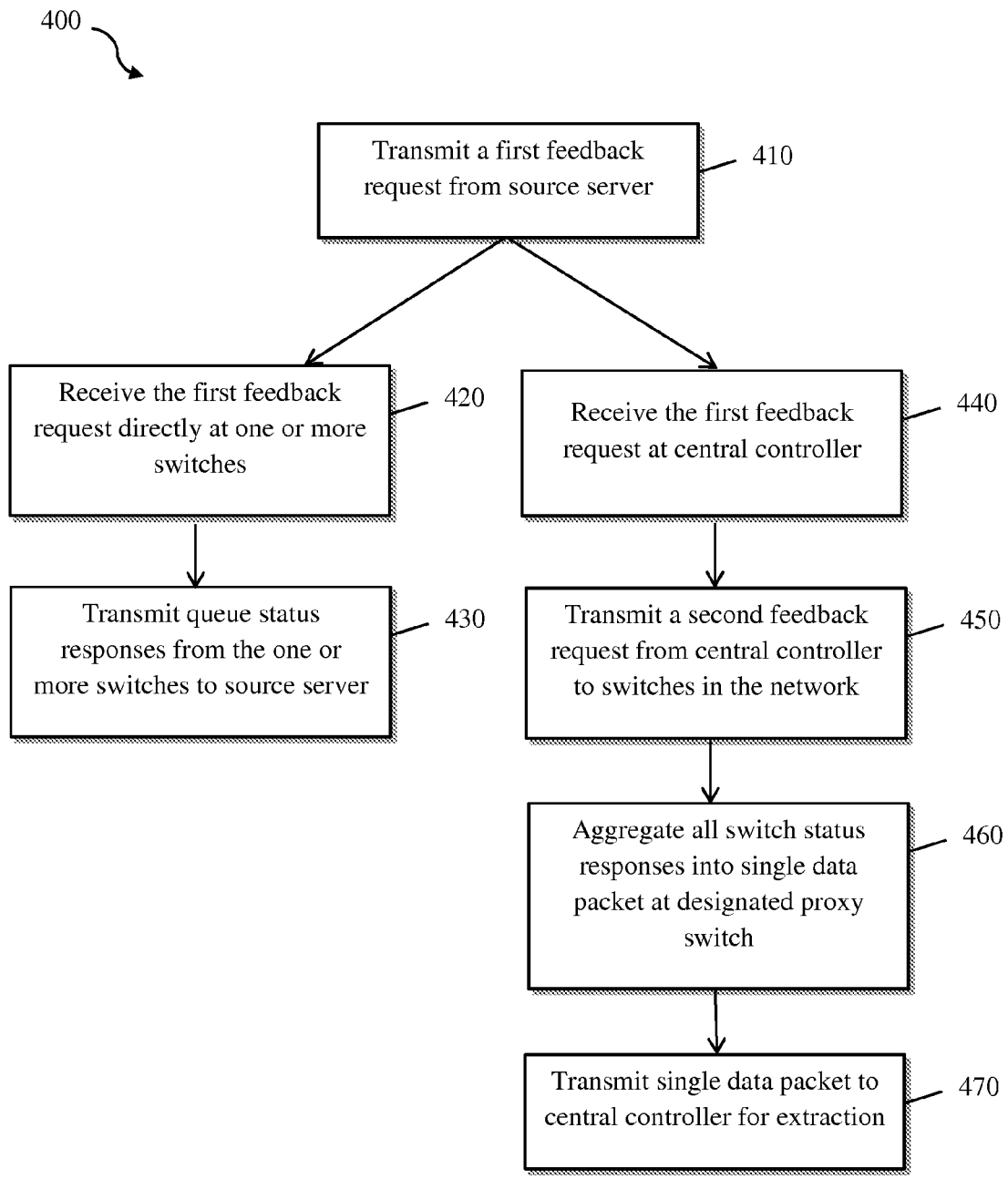
FIG. 4 depicts a flow diagram of a feedback request process for proactively probing a current state of the queues of a plurality of network switches according to an embodiment.

Turning now to FIG. 4, a process performed by an embodiment of the network congestion processing module 67 is generally shown. As shown in FIG. 4, the feedback request process 400 proactively probes a current state of the queues of a plurality of network switches according to an embodiment. According to an embodiment, the plurality of switches may be quantized congestion notification (QCN)-compliant switches. Moreover, an embodiment may be implemented using software-defined networking (SDN) enabled by an OpenFlow communications protocol.

At block 410, a source server of an embodiment transmits a first feedback request to probe one switch, a few switches along a source-to-destination downstream path, or all of the switches in the network to determine a status of the queues of each of the switches. The probed switch (e.g., a QCN congestion point, a sampled queue within the physical or virtual fabric) may reply to the first feedback request by providing its status response direct to the requester, whether this is a source server or a central controller.

According to an embodiment, the first feedback request may be triggered periodically. For example, an embodiment may predetermine the frequency (e.g., every five seconds or every minute) for transmitting the first feedback request to probe the status of all the switches in the network. According to another embodiment, the first feedback request may be transmitted when a set point threshold (Qeq) is exceeded at a queue of one of the plurality of switches in the network. In this case, when a queue of a switch overflows, the first feedback request may be transmitted to probe the status of all the switches in the network.

In one embodiment, a source server may transmit a first feedback request directly to one switch from block 410, thus polling a single switch/queue status. According to another embodiment, the source server may send a first feedback request to a plurality of switches from block 410, thus polling all the queues to be probed along a fabric path towards a destination endnode. At block 420, one or more switches in the network may receive the first feedback request. According to an embodiment, each probed switch may reply directly to the requester (e.g., the source server), as shown in block 430, while also forwarding the first feedback request downstream towards the final destination. In case of a first feedback request being transmitted directly to a plurality of switches on a path, the probed queue of the switch or adapter will also forward downstream the original feedback request, optionally marking a bit field with the current position in the path. The reply may be sent back to the original requester through a 64B QCN Congestion Notification Message (CNM), or any other known Ethertype frame.

According to another embodiment, a source server may transmit a first feedback request to a central controller from block 410. At block 440, a central controller of an embodiment receives the first feedback request. According to an embodiment, the central controller may be running on a separate server. Additionally, the central controller may be an OpenFlow, or an OpenStack, controller located on a control plane separate from the data plane for the connected switches in the network.

At block 450, responsive to receiving the first feedback request, the central controller may transmit a second feedback request to all switches in the network that are included in a full path or sub path leading to a designated destination according to an embodiment. The second feedback request of an embodiment probes the switches in the network and queries the status of their respective queues. Accordingly, all the network switches sample all or some of their affected queues (i.e., those along a specified path). According to an embodiment, all this data would be transmitted to the original requester, which may be a central controller (OF or OS) in this embodiment.

In a medium size network of the contemporary art with hundreds of ports on all the switches and every port having its own queue having eight priority levels, a controller may easily be inundated with thousands of messages every time a feedback request is transmitted. Therefore, at block 460, an embodiment provides a designated proxy switch that aggregates the responses to the second feedback request from the switches into a single data packet. The designated proxy switch runs an aggregation algorithm that takes all of the received status information from the queried switches, compresses the status information into one frame, and transmits the single data packet frame to the central controller that transmitted the second feedback request, as shown in block 470.

If it is the original requester, the central controller of an embodiment receives the single data packet frame and extracts the necessary feedback responses therefrom. The extracted responses may be sent back to a source server that initiated the first feedback request so that the source server can view the current status of all the queues in the network. According to an embodiment, if the current status of the network indicates a trend toward congestion in a certain area of the network, the central controller may be informed of the trend to proactively avoid an occurrence of congestion. According to another embodiment, the central controller itself may discover the trend toward congestion in a certain area of the network. According to another embodiment, the original requester is a source endnode that directly polls via a first feedback request one or more queues in switches along a network path toward a destination without resorting to central controllers intermediaries.

While adaptive re-routing or load balancing is possible applications of an embodiment, they remain mere potential byproducts of the feedback request feedback loop. Balancing and adaptive routing can be performed locally, by each traffic source (e.g., source server), based on the responses received from switches to its feedback request polls or by centralized controllers that aggregate multiple feedback request polls into coordinated load balancing actions.

That is, the central controller may reroute packet traffic based on the feedback responses to proactively avoid congestive hotspots. According to an embodiment, the central controller communicates with the appropriate switches in the path leading to the designated destination to enable each of the switches to proactively adapt to trending network conditions. The network is sampled periodically so that the central controller may observe a pattern of congestion in the network according to an embodiment. Based on the observed pattern of congestion in the network, the central controller of an embodiment may change the traffic pattern to proactively avoid congestion points.

According to another embodiment, the central controller may maintain a history of previous feedback request results. In other words, a source server may probe the network with a feedback request packet and keep several iterations of the feedback history to observe how congestion points are evolving. The central controller may then associate the history with traffic patterns on the network. Accordingly, with a logged historical profile of previous feedback request data results, the central controller may make rerouting decisions purely based on the historical profile without needing to transmit another feedback request. According to an embodiment, the history may be saved for a variably defined period of time.

According to an embodiment, a full network path or a whole network fabric may be probed with one feedback request. According to another embodiment, only paths or certain network regions that are prone to congestion based on prior history would be probed with each feedback request. In other words, the controller would not have to query the whole network and can drill down and only query queues of switches/elements that are prone to congestion or lead to hotspots according to an embodiment.

Embodiments disclosed herein provide proactive feedback request packets to (i) a central controller that transmits feedback requests to all network switches for their status, as well as (ii) the direct probing option, from a single traffic source to one or more queues/switches along the path toward a destination. For case (i), a designated proxy switch of an embodiment performs an aggregation algorithm and transmits a single data packet back to the controller. The central controller analyzes the single data packet and may use it to create elements of a heatmap for the network according to an embodiment. Optionally, an embodiment may maintain a history of previous feedback request data results and select rerouting decisions based on the historical traffic profiles.

Technical effects and benefits of embodiments include the ability to proactively predict where congestion hotspots will occur in the network before they happen and proactively reroute traffic to avoid the occurrence of the predicted congestion points.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system, comprising:
a memory having computer readable instructions; and a processing device for executing the computer readable instructions, the instructions including:
receiving a first feedback request at a central controller connected to a plurality of switches in a network, the first feedback request including a request to periodically probe a status of queues of the plurality of switches in the network;
based on receiving the first feedback request, transmitting a second feedback request to one or all of the plurality of switches in a path leading to a designated destination, the second feedback request including a request to probe a status of queues of the one or all of the plurality of switches;
receiving responses to the second feedback request from a designated proxy switch, the designated proxy switch having aggregated the responses from the plurality of switches into a single data packet;
extracting the responses from the single data packet at the central controller;
predicting a congestion point in the network based on the extracted responses; and
proactively preventing the congestion point based on the predicting.

2. The computer system of claim 1, wherein the proactively preventing further comprises a selected one of reporting statistics to a feedback requester, rerouting packet traffic, and adjusting source injection rates.

3. The computer system of claim 1, further comprising:
logging a history of feedback request responses received at the central controller;
observing an evolution of congestion points in the network based on the history; and
rerouting packet traffic based on the history without transmitting a further feedback request.

4. The computer system of claim 3, wherein the central controller transmits the second feedback request to a subset of the plurality of switches in the network that are prone to congestion based on the history.

5. The computer system of claim 1, further comprising:
receiving a third feedback request directly at one or more of the plurality of switches in the network, the third feedback request including a request to periodically probe a status of queues of the plurality of switches in the network; and
transmitting a queue status response directly from the one or more of the plurality of switches to a source server.

6. The computer system of claim 1, wherein the first feedback request is transmitted responsive to a set point threshold being exceeded in a queue of one of the plurality of switches.

* * * * *